(12) United States Patent
Raichek

(10) Patent No.: US 8,200,849 B1
(45) Date of Patent: Jun. 12, 2012

(54) MODEL BASED NETWORK COMMUNICATIONS

(75) Inventor: Jonathan Raichek, Westford, MA (US)

(73) Assignee: The MathWorks, Inc., Natick, MA (US)

( * ) Notice: Subject to any disclaimer, the term of this patent is extended or adjusted under 35 U.S.C. 154(b) by 395 days.

(21) Appl. No.: 12/134,405

(22) Filed: Jun. 6, 2008

(51) Int. Cl.
*G06F 15/16* (2006.01)

(52) U.S. Cl. ........................................ 709/250

(58) Field of Classification Search ................. 709/250
See application file for complete search history.

(56) References Cited

U.S. PATENT DOCUMENTS

| | | | | |
|---|---|---|---|---|
| 5,721,843 A * | 2/1998 | Ganti et al. | ................... | 712/29 |
| 5,832,503 A * | 11/1998 | Malik et al. | ................... | 709/223 |
| 5,872,956 A * | 2/1999 | Beal et al. | ................... | 709/224 |
| 7,016,949 B1 * | 3/2006 | Tagawa | ................... | 709/223 |
| 7,089,307 B2 * | 8/2006 | Zintel et al. | ................... | 709/224 |
| 7,961,636 B1 * | 6/2011 | Barach et al. | ................... | 370/252 |
| 2004/0122645 A1 * | 6/2004 | Shevenell et al. | ................... | 703/21 |
| 2006/0020411 A1 * | 1/2006 | Gedamu et al. | ................... | 702/117 |
| 2008/0146181 A1 * | 6/2008 | Mason et al. | ................... | 455/234.1 |
| 2009/0182861 A1 * | 7/2009 | Hirsch | ................... | 709/223 |
| 2009/0228566 A1 * | 9/2009 | Sharp et al. | ................... | 709/207 |

* cited by examiner

*Primary Examiner* — Larry Donaghue
(74) *Attorney, Agent, or Firm* — Harrity & Harrity, LLP

(57) ABSTRACT

In an implementation, a model executing at a target device may use networking services integrated within the model instead of using networking services of the operating system kernel. Latency and non-deterministic behavior associated with using networking services of the operating system kernel may be reduced. Computer-readable media may include instructions for compiling a model, that represents a design, for execution on a target computing device, the compiled model including one or more software components for directly communicating with a network adapter on the target computing device to handle network communications. The computer-readable media may additionally include instructions for transmitting the compiled model to the target computing device, the model, when executed, providing control over network communications at the target computing device.

32 Claims, 13 Drawing Sheets

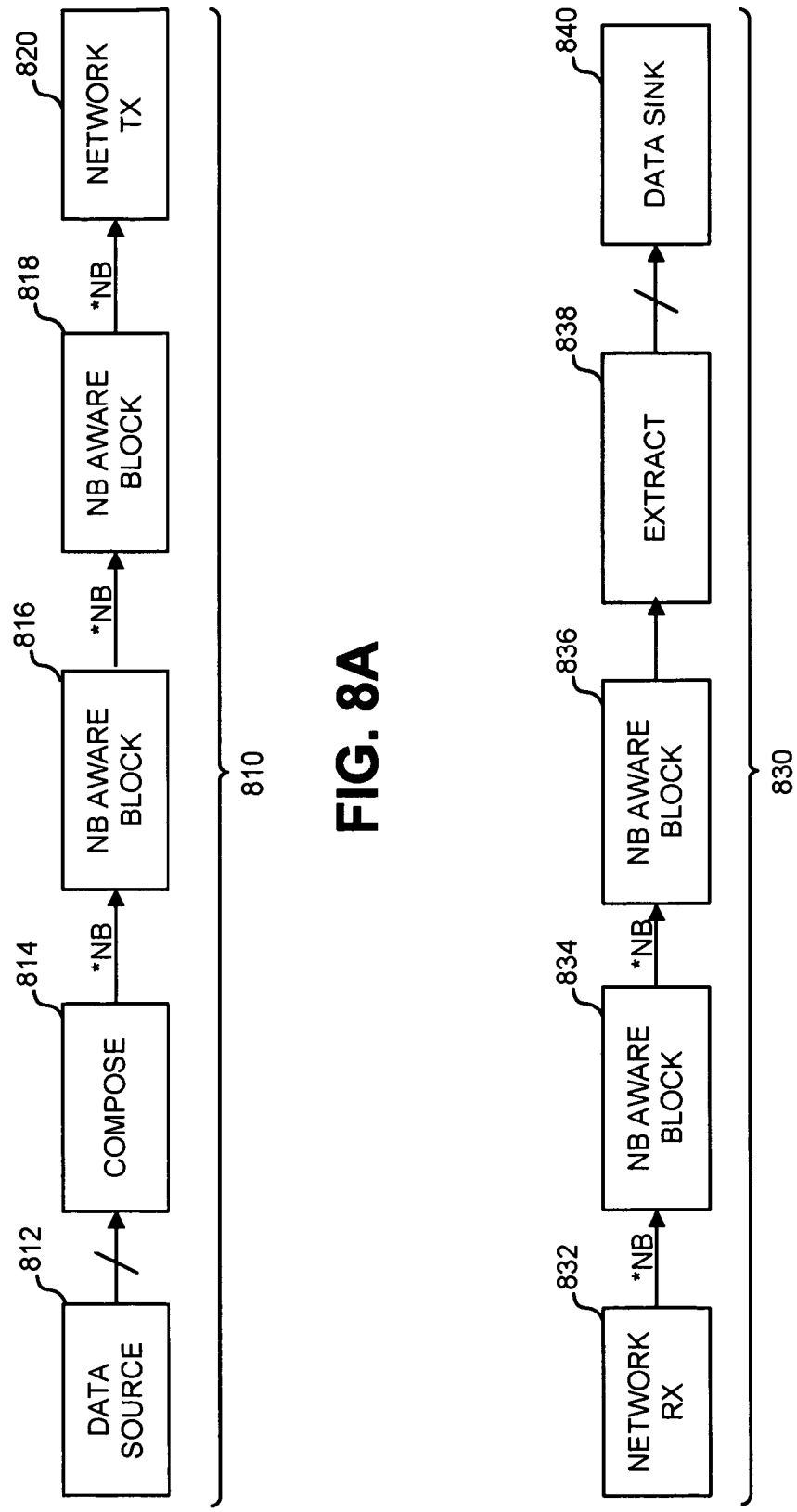

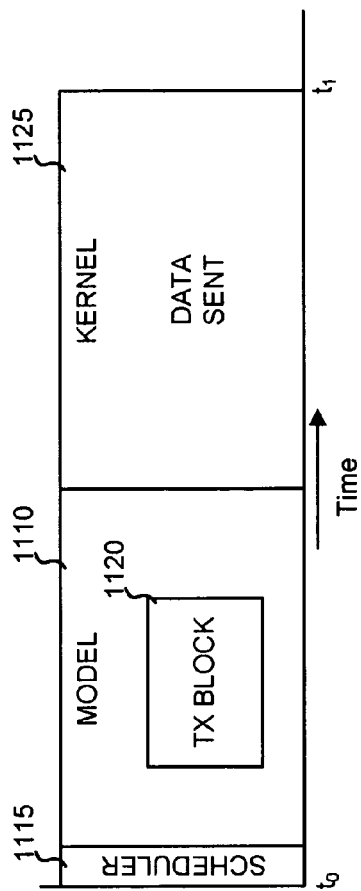
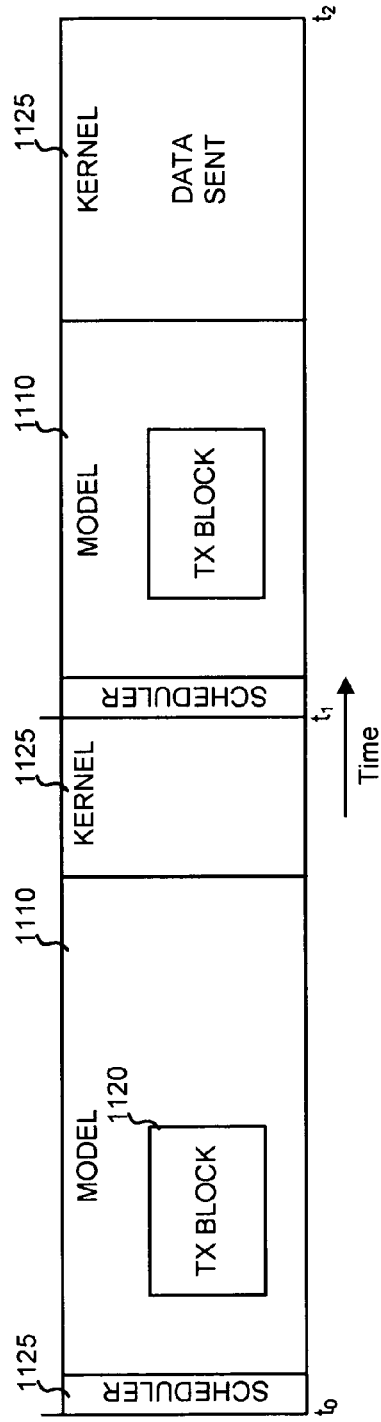
FIG. 11A
FIG. 11B

MODEL BASED NETWORK COMMUNICATIONS

BACKGROUND

Technical computing environments are known that present a user, such as a scientist or engineer, with an environment that enables efficient analysis and generation of technical applications. For example, using certain technical computing environments, users may perform analyses, visualize data, and develop algorithms. Technical computing environments may allow a technical researcher or designer to efficiently and quickly perform tasks such as research and product development.

Existing technical computing environments may be implemented as or run in conjunction with a graphically-based environment. For example, in one existing graphically-based technical computing environment, graphical modeling tools allow models to be built by connecting graphical blocks, where each block may represent an object associated with functionality and/or data. Blocks may be hierarchical in the sense that a block itself may contain one or more sub-blocks that make up the block. A user may, for instance, view the model at a high level, then select blocks to drill down into the model to see increasing levels of model detail.

Generated models may be directly converted to computer code by the graphical modeling tool, which can then be executed, e.g., by a target device in a target environment. For example, a model of a control system for an assembly line may be graphically developed with the graphical modeling tool, implemented as code, and then deployed in a target device (e.g., a dedicated computer) tasked with controlling the assembly line. The target device may itself be connected to one or more sensors or other computers on the assembly line.

When connecting multiple target computer devices or other network devices, it is often desirable to use proven networking technologies, such as Ethernet. Ethernet implemented via typical personal computers, however, can exhibit variable and unpredictable latency in time between the time an application "sends" data to the time the data is actually sent from the Ethernet network adapter of the computer. In many situations, such as applications designed to control or monitor systems in real-time, such latency can be problematic.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 8A is a diagram illustrating network buffer aware blocks in a network transmit path of a model;

FIG. 8B is a diagram illustrating network buffer aware blocks in a network receive path of a model;

FIGS. 11A-11C are exemplary timing diagrams illustrating execution of a model in relation to a real-time OS kernel.

DETAILED DESCRIPTION

Figure 1:
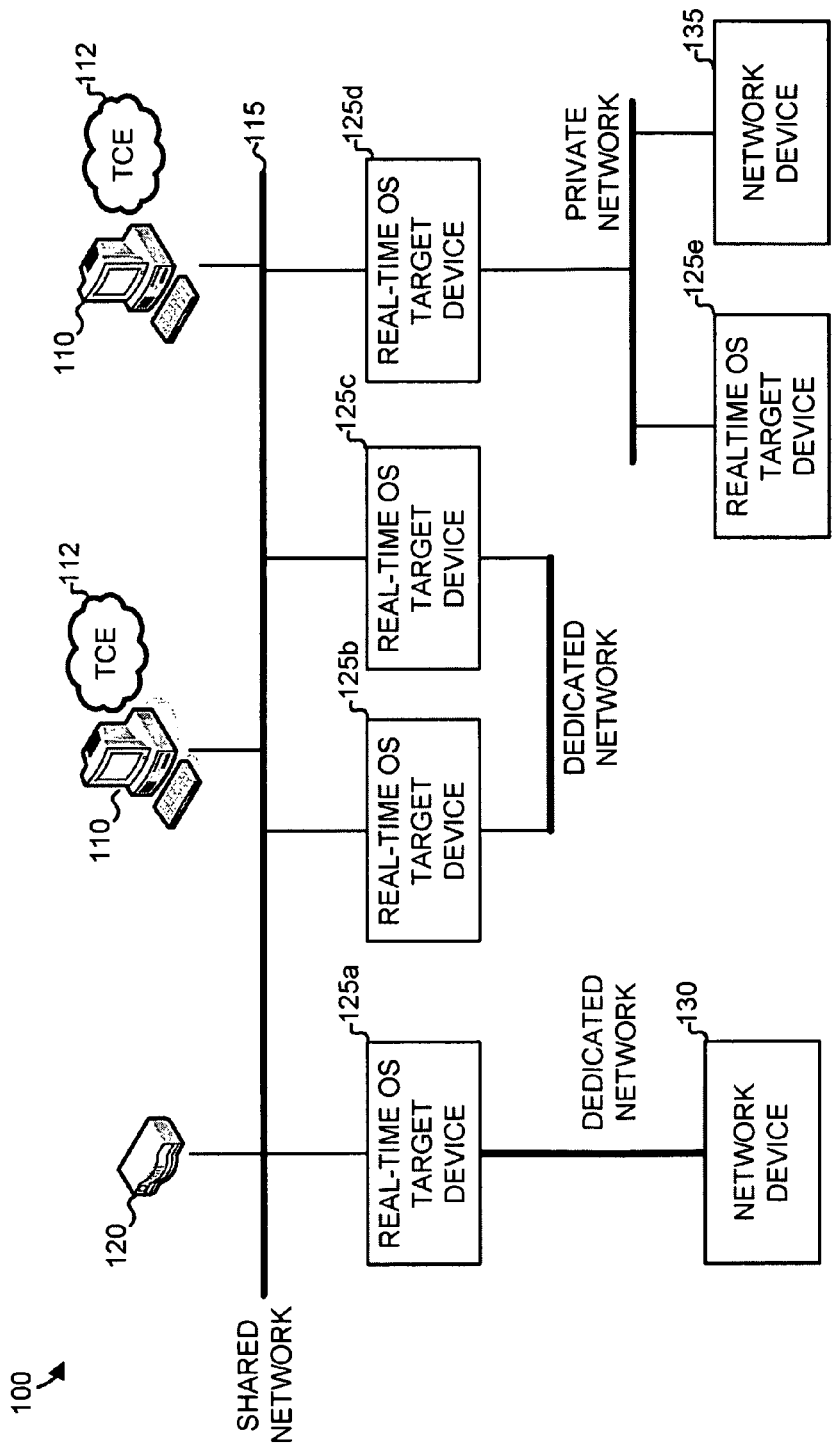
FIG. 1 is an exemplary diagram of a system in which concepts described herein may be implemented.

The following detailed description refers to the accompanying drawings. The same reference numbers in different drawings may identify the same or similar elements. Also, the following detailed description does not limit the invention.

OVERVIEW

Implementations described herein relate to models of systems or processes that may execute on a computing device and that may interact with external devices. Such a model may be, for example, a model that controls a process based on data received from external sensors (or other network devices). The external sensors may transmit data to the model using a network technology such as Ethernet. Drivers for the network, such as custom Ethernet drivers, may be written and compiled as part of the model. In this manner, the model may maintain a high level of control over network communications which can lead to reduced and/or more predictable latency when communicating with the external devices via a network.

DEFINITIONS

A "technical computing environment," as the term is used herein, is to be broadly interpreted to include hardware and/or software based logic that provides a computing environment that may allow users to efficiently perform tasks related to disciplines, such as, but not limited to, mathematics, science, engineering, medicine, business, etc. In an implementation, a technical computing environment may include a dynamically-typed programming language (e.g., the MATLAB® M language) that can be used to express problems and/or solutions in mathematical notations. For example, a technical computing environment may use an array as a basic element, where the array may not explicitly require dimensioning. In addition, a technical computing environment may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A technical computing environment may further provide mathematical functions and/or graphical tools or blocks (e.g., for creating plots, surfaces, images, volumetric representations, etc.). In an implementation, a technical computing environment may provide these functions and/or tools using toolboxes (e.g., toolboxes for signal processing, image processing, data plotting, parallel processing, etc.), as block sets, via a library, etc.

A technical computing environment may be implemented as a text-based environment (e.g., MATLAB® software; Octave; a Python-based development environment; a Comsol Script based development environment; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; a Modelica-based development environment or Dymola from Dynasim; etc.), a graphically-based environment (e.g., Simulink® software, Stateflow® software, SimEvents™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro, Advanced Design System, or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

System Description

FIG. 1 is an exemplary diagram of a system 100 in which concepts described herein may be implemented. The system 100 may include one or more personal computers or workstations 110 connected to network device(s) 120 and 125a-d via a shared network 115. Network device 120 may be, e.g., a printer, router, gateway, etc. The network 115 may be a data network configured to enable the devices 120, 125a-d and the workstations to intercommunicate and exchange information (e.g., data) using various networking protocols, such as Ethernet, Asynchronous Transfer Mode (ATM), token ring, Internet Protocol (IP), Transmission Control Protocol (TCP), User Datagram Protocol (UDP), etc.

One particular type of network device that may be connected to workstations 110 includes a real-time operating system (RTOS) target device 125. An RTOS device 125 may include a computer executing a real-time operating system (RTOS). RTOSs are generally known and can include multitasking operating systems intended for real-time applications, such as embedded systems, industrial robots, spacecraft, industrial control, consumer electronics, and scientific research equipment. RTOS devices 125 may provide facilities to guarantee that deadlines can be met generally or deterministically. Processes executing on an RTOS device 125 may, for example, be guaranteed to be able to execute one complete model iteration in a given time period.

RTOS devices 125 may be connected to other network devices through additional networks. For example, dedicated or private networks may be used to connect RTOS devices 125a-d to additional network devices 130 or 135, or even to additional RTOS devices, such as RTOS device 125e. Additional network devices 130 and 135 may be, for example, sensors, tuners, robotic arms, other industrial control equipment, etc.

Workstation 110 may execute a technical computing environment (TCE) 112 that presents a user with an interface that enables analysis and generation of technical applications. For example, the TCE 112 may provide a numerical and/or symbolic computing environment that allows for matrix manipulation, plotting of functions and data, implementation of algorithms, creation of user interfaces, and/or interfacing with programs in other languages. As will be described in more detail below, users may create graphical models via TCE 112. The models may be compiled and transmitted, such as via shared network 115, to RTOS devices 125. At the RTOS devices 125, the models may execute to perform the functions for which the models were designed.

Figure 2:
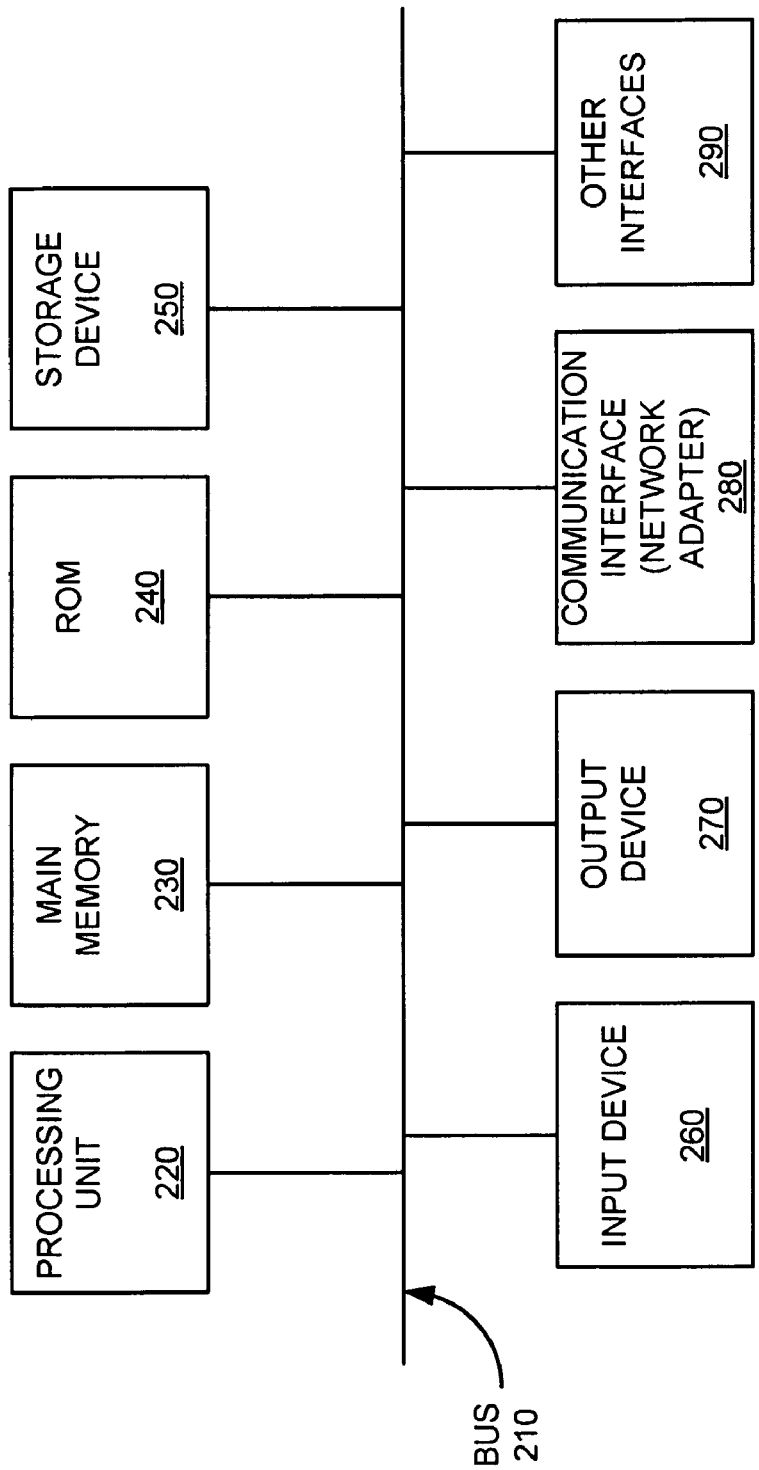
FIG. 2 is a diagram of an exemplary device corresponding to one of the computing devices shown in FIG. 1.

FIG. 2 is a diagram of an exemplary computing device 205, such as a device corresponding to workstation 110, RTOS devices 125, or network devices 120, 130, or 135. As illustrated, device 205 may include a bus 210, a processing unit 220, a main memory 230, a read-only memory (ROM) 240, a storage device 250, an input device 260, an output device 270, a communication interface (also called a network adapter herein) 280 and one or more other interfaces 290. Bus 210 may include a path that permits communication among the components of device 205.

Processing unit 220 may include a processor, microprocessor, or other types of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 205, such as a keyboard, a mouse, a pen, a microphone, a camera, a keypad, a multi-point touch interface, voice recognition and/or biometric mechanisms, etc. Output device 270 may include a mechanism that outputs information to the operator, including a display, a printer, a speaker, etc.

The other interfaces 290 may include one or more adapters that may be configured to interface the computing device 205 with various devices. For example, the other interfaces 290 may include a data input/output (I/O) interface that may be used to interface the computing device 205 to a data I/O device. Likewise, the other interfaces 290 may include an analog-to-digital (ND) interface, a digital-to-analog (D/A) interface, etc. that are configured to interface the computing device to 205 and one or more ND devices, D/A devices, etc.

Communication interface 280 may include any transceiver-like mechanism that enables device 205 to communicate with other devices and/or systems. For example, communication interface 280 may include a network adapter, such as an Ethernet "card," that handles the physical transmission of data via a network, such as network 115. In some situations, device 205 may include multiple communication interfaces. For example, RTOS devices 125, as shown in FIG. 1, may be connected to a shared network and to a second network (labeled dedicated or private in FIG. 1). Each connection can be implemented with a separate network adapter. It should be noted that the RTOS devices 125 may be connected to multiple dedicated and/or private networks.

As will be described in detail below, workstations 110 and RTOS devices 125 may perform certain operations in response to processing unit 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

The computer-readable medium may particularly include TCE 112. TCE 112 may include any of the features defined above with respect to the term "technical computing environment." For example, in one implementation, the technical computing environment may include MATLAB® software (available from The MathWorks, Inc., Natick, Mass.) that provides a variety of mathematical functions and/or graphical tools. In particular, TCE 112 may provide an interface through which models are constructed.

Although FIG. 2 shows exemplary components of device 205, in other implementations, device 205 may contain fewer, different, or additional components than depicted in FIG. 2. In still other implementations, one or more components of device 205 may perform one or more tasks performed by one or more other components of device 205.

As previously mentioned, models may be created and implemented on one or more RTOS devices 125. The models may receive and act on information from external network devices, such as sensors. The models may also transmit information, such as control information, to the external network devices. The external network devices may be connected via a network connection, such as, e.g., an Ethernet connection. To minimize or eliminate collisions or other sources of non-deterministic latency in the network connection, network connections between the RTOS devices 125 and the external network devices may optionally be private or dedicated network links which may be part of one or more private or dedicated networks.

A model, as used herein, may generally be an application defined by a specification used to implement a system or process. A compiled version of the model may execute on a computing device and may interact with external devices. The model may be specified using a number of different techniques. For example, the specification describing the model may be a declarative specification (i.e., one written using a declarative programming language such as a data-flow diagram or a time-based block diagram), an imperative specification (i.e., one written using an imperative programming language, such as textual languages (e.g., C, C++, SystemC, and Fortran) or graphical languages (e.g., Statecharts)), or a combination of the two. Additionally, the model specification may be designed using a hardware description language or an array-based imperative language such as the MATLAB® M language. Further, the model specification may be designed in a graphical environment, such as Simulink®.

Figure 3:
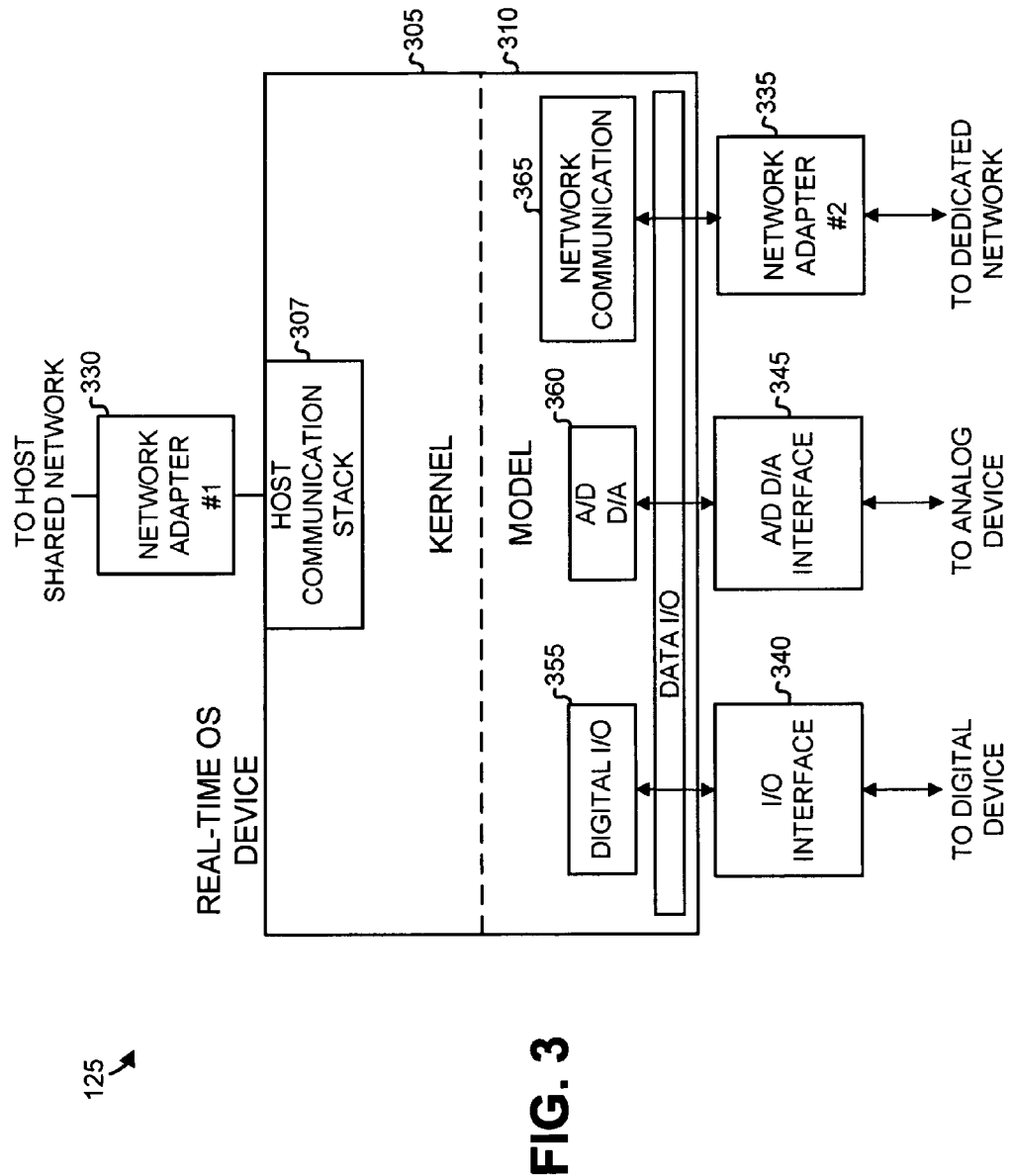
FIG. 3 is a diagram that illustrates exemplary software or hardware components of a real-time operating system device.

FIG. 3 is a diagram illustrating exemplary software and hardware components of an RTOS device 125. Referring to FIG. 3, RTOS device 125 may include a software kernel 305. Kernel 305 may be a real-time operating system kernel. Commercial RTOS kernels are known. Kernel 305 may control the basic operation of RTOS device 125, and may include facilities for executing applications to provide applications with guarantees that processes can be completed within fixed time deadlines. Model 310 may be a real-time application controlled by kernel 305.

Kernel 305 may include a host communication stack 307. Host communication stack 307 may include software components designed to communicate over an external network. Host communication stack 307 may operate in conjunction with one or more network adapters, such as network adapter 330. Network adapter 330 may include hardware, such as a separate network card or network circuitry implemented in the main board of RTOS device 125, to communicate over a network. Communications from model 310 to/from the network may generally be characterized by relatively non-deterministic delay, caused by, for example, delay introduced by kernel 305, host communication stack 307, or delays inherent to, e.g., the network or a multi-tasking operating system. Although such delays may be acceptable for non-real time applications, the delays may cause problems for applications that need to interact with external network devices in real-time.

As previously mentioned, model 310 may be an application designed to control or monitor external devices in real-time. For example, model 310 may receive information from and send information to a number of devices in a manufacturing line. The external devices may include devices connected directly to RTOS device 125, such as digital or analog devices connected directly to RTOS device 125. Model 310 may include digital I/O component 355 for connecting to one or more external digital devices via a digital I/O interface 340. Digital I/O interface 340 may be an interface through which RTOS device 125 may directly connect to one or more attached digital devices, such as a digital temperature sensor, digital camera, etc. Similarly, model 310 may include an analog-to-digital (A/D) and digital-to-analog (D/A) component 360 for connecting to one or more external analog devices via an ND D/A interface 345. Interface 345 may directly connect to one or more attached analog devices, such as an analog temperature sensor, camera, etc.

Model 310 may additionally connect to certain external devices through a network. Model 310 may connect to these external devices using network communication component 365, which may include e.g., network communications drivers (e.g., Ethernet drivers), compiled directly into model 310. Network communication component 365 may include, for instance, custom drivers written for another network adapter 335. Model 310, because it includes communication drivers compiled as a part of model 310, may directly communicate with network adapter 335, as opposed to indirectly communicating with network adapter 330 through host communication stack 307 of kernel 305. Thus, non-deterministic delays associated with network communications conducted by model 310 (e.g., through network adapter 335) may be significantly reduced. This can be particularly advantageous for the control of real-time or near real-time external network devices.

Model 310 may be designed or modified using TCE 112. More particularly, TCE 112 may provide a graphical interface that allows the user to arrange blocks that represent functionality and/or data in model 310. The created model 310 may be compiled, transmitted to, and run at, for example, RTOS device 125.

Before describing the real-time control of network communications by model 310 in additional detail, it may be helpful to describe the creation of an exemplary model generated with TCE 112.

Figure 4:
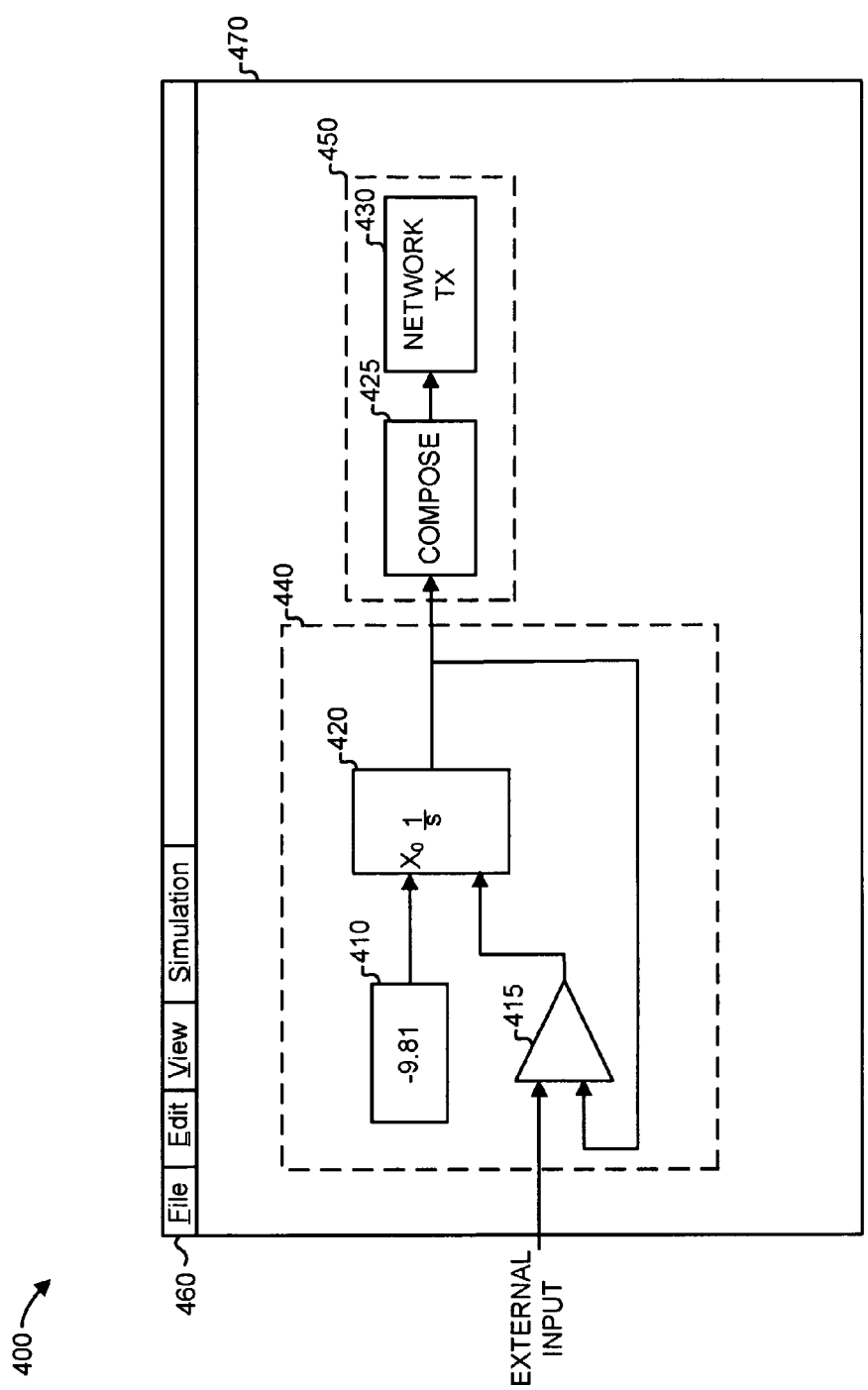
FIG. 4 is a diagram illustrating an exemplary graphical interface in which a model may be generated.

FIG. 4 is a diagram illustrating an exemplary graphical interface 400 in which a model may be generated. The graphical interface 400 may include a model area 470 in which a model (e.g., constructed of graphical blocks) can be built by a user. The model described below as being constructed in model area 470 represents only one example of a model that may be generated. Many different models, or types of models, may be generated using TCE 112.

A user may select blocks and place the blocks in model area 470. For example, a user may select a block from a block library and may move the block into model area 470 using a pointing device, such as a mouse. A block may represent functionality and/or data and may be defined using various programming languages. A block may also itself be defined by one or more other blocks.

In the example of FIG. 4, model area 470 includes three network unaware blocks 440 (blocks 410, 415, and 420) and two network related (also called "network aware" herein) blocks 450 (blocks 425 and 430). The model shown in FIG. 4 may have been generated by a user placing each of blocks 410 through 430 in model area 470, connecting inputs and outputs of the blocks to create logical connections between the blocks, and configuring parameters relating to the blocks.

Menu bar 460 may include a number of graphically selectable menu options, such as a file menu option, an edit menu option, a view menu option, and a simulate menu option. Each menu option may correspond to, for example, a user-selectable command or a sub-menu with additional commands. Details relating to the operation of these commands are not necessary for an understanding of a model, and will thus not be described in more detail herein.

The blocks in network unaware blocks 440 include a constant block 410, a multiplication block 415, and an integrator block 420. These blocks may be "normal" model blocks not related to network transmission. Constant block 410 may be used to generate a constant value (e.g., −9.81). The output of constant block 410 may be input to integrator block 420, which may perform an integration operation based on its inputs. Integrator block 420 may also receive the output of multiplication block 415 as an input. Multiplication block 415 may perform a multiplication operation on its inputs. As shown in FIG. 4, the inputs to multiplication block 415 may include an external input signal and the output signal from integrator block 420.

Although the example interface shown in FIG. 4 is a graphical interface, in alternative implementations, a user may specify a model using a non-graphical (e.g., a textual) interface.

Consistent with aspects described herein, a user designing a model with TCE 112 may integrate real-time network control into the model by manipulating blocks, such as network aware blocks 450, designed to enable network access. Two network aware blocks are shown in FIG. 4: a compose block 425 and a network transmit (TX) block 430. Compose block 425 may be a block designed to act as an interface between the network aware and network unaware portion of the model. Compose block 425 may, for instance, receive data from integrator block 420 and convert the data into a format that may be used for an efficient passing of data within a model and for network transmissions. As will be described in more detail below, network aware blocks 450 may pass network data between one another by passing a pointer to a buffer.

Figure 5:
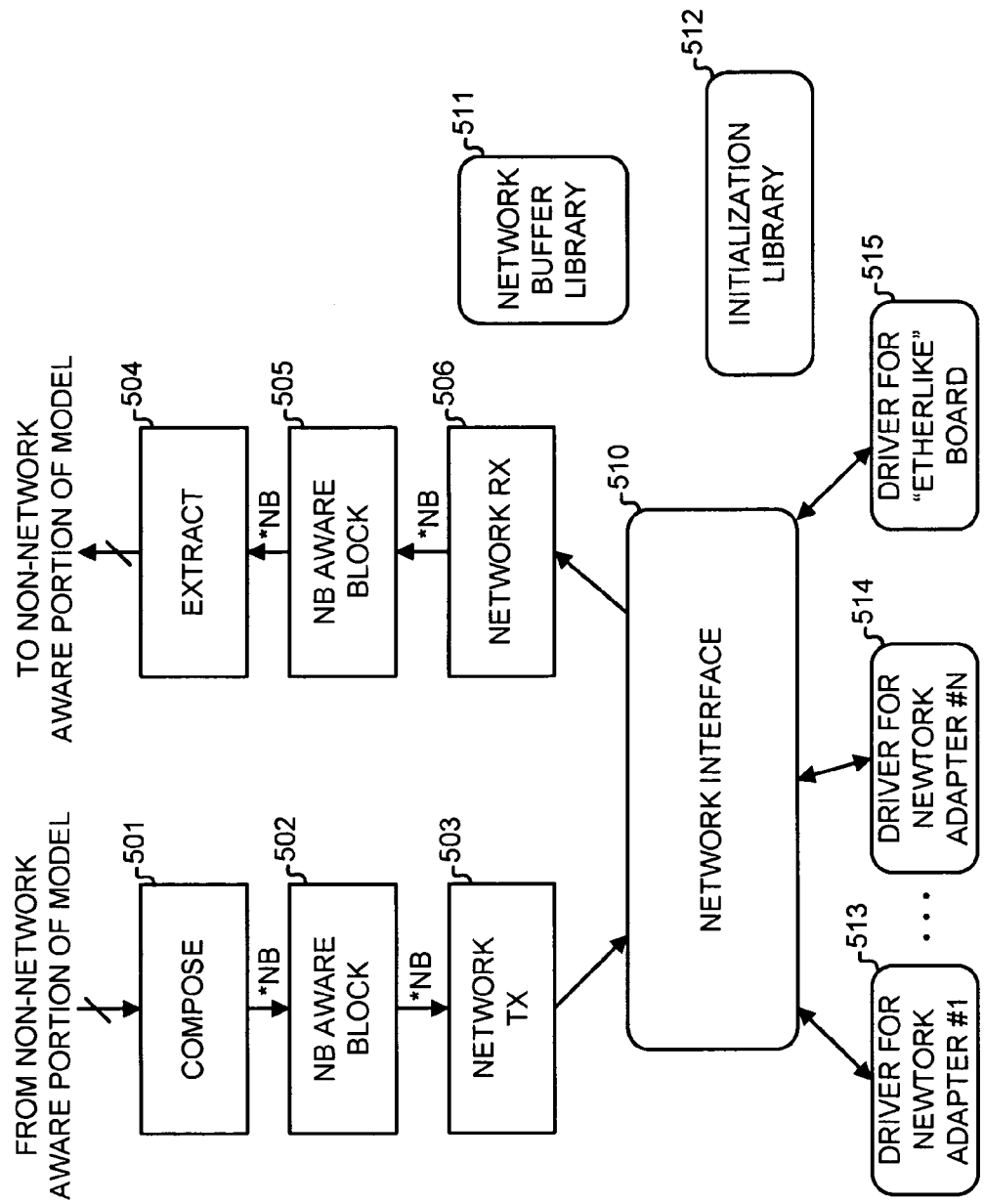
FIG. 5 is a diagram illustrating exemplary software sections of a "network aware" portion of a model.

FIG. 5 is a diagram illustrating exemplary software sections of a model relating to the network aware portion of the model. In FIG. 5, blocks that may normally be manipulated by a user (e.g., in model area 470) when designing a model are shown as rectangles. These blocks include compose block 501, network buffer (NB) aware block 502, network transmit (TX) block 503, extract block 504, NB aware block 505, and network receive (RX) block 506. Users may manipulate these blocks to create models, such as the exemplary model shown in FIG. 4. With blocks 501-506, users may generally integrate real-time control over network communications into their models.

In addition to user manipulable blocks 501-506, a number of other software components 510-515 are shown in FIG. 5. Components 510-515 are illustrated as rectangles having rounded edges, and may represent libraries, drivers, or other software modules that may be used by TCE 112 when generating a model. Components 510-515 include network interface 510, network buffer library 511, initialization library 512, and drivers for network adapters 513-515. Components 510-515 are typically not directly manipulated by the user when designing a model 310. Instead, components 510-515 may be automatically used by TCE 112 when compiling or simulating the model.

Compose block 501, network buffer aware block 502, and network transmit component 503 may define an exemplary series of blocks arranged by a user for transmitting data over a network connection. Compose block 501, as with compose block 425 (FIG. 4), may receive data from another, network unaware block, in the model. For example, network unaware blocks in the model may pass data between each other as vectors or other structures. The network aware blocks, however, in order to, e.g., more efficiently handle large quantities of data, may use buffers to store data, in which only a pointer to the buffer is passed between the network aware blocks. Compose block 501 may provide an interface between the network aware blocks and the network unaware blocks. Compose block 501 may, for instance, receive vector data, store the vector data in a network buffer via a call to network buffer library 511, and pass a pointer to the vector data to the next block in the sequence (i.e., network buffer aware block 502). The network buffer may be in a memory that is accessible to a network adapter in a system (e.g., computer system) that is configured to execute the model. The network adapter may be configured to use direct memory access (DMA) techniques to transfer data to and from the network buffer.

In FIG. 5, the notation "*NB" between blocks 501 indicates that these blocks pass pointers to a network buffer, a chain (e.g., linked list) of network buffers, etc.

In alternative possible implementations, the network aware and network unaware blocks may both use the same data format, such as a data format based on the passing of vectors between blocks or one based on the passing of pointers between blocks. In this situation, compose block 501 may be omitted.

Network aware block 502 may be a model block designed to operate using the data format (e.g., network buffers) used by compose block 501. Network aware block 502 may embody, for example, logic to process the data stored in the network buffers. Network aware block 502 may be designed by the provider of TCE 112, by a third party, or may be created as a custom model block by the user of TCE 112. Although only one network aware block 502 is shown in the chain of blocks 501-503, it can be appreciated that a model could be constructed that potentially includes multiple network aware blocks each performing different functions on the input data. Alternatively, a model may omit network aware block 502.

Network transmit block 503 may perform a number of functions relating to transmission of the data in the received network buffer over a desired network link. For example, network transmit block 503 may initially register a network adapter (for example, the network adapter associated with the driver for network adapter #1) that is to be used for the transmission. Network transmit block 503 may also potentially format and then forward the data to network interface 510.

Extract block 504, network buffer aware block 505, and network receive block 506 function analogously to blocks 501-503 for reception of data over the network. More particularly, network receive block 506 may communicate with network interface 510 to initially register for the reception of data from a particular network adapter, network type (e.g., EtherType), etc. Network receive block 506 may subsequently receive the data from network interface 510 in the one or more network buffers and potentially format the data, such as by modifying the data in the network buffers. A pointer (*NB) to the network buffers may then be passed to network buffer aware block 505.

In an embodiment, during reception, drivers 513, 514 and 515 may maintain a ring of network buffers. These buffers may be written to directly by the network adapter. Pointers to the buffers may be forwarded to the network interface 510 and subsequently to blocks 506, 505 and 504.

Network buffer aware block 505 may function similarly to network buffer aware block 502. That is, network buffer aware block 505 may be a model block designed to operate using the data format (e.g., network buffers) used by network receive block 506 and, underlying libraries and drivers. Network aware block 505 may embody, for example, logic to process the data stored in the network buffers.

Extract block 504 may receive data from a network aware block, such as network buffer aware block 505 or network receive block 506, and convert the data into a form useable by network unaware blocks. Extract block 504 may thus provide an interface between the network aware blocks and the network unaware blocks in a model.

As previously mentioned, components 510-515 in FIG. 5 may represent libraries, drivers, or other software elements that would not typically be seen by a user when designing a model with TCE 112. Instead, these components may be called by each other or by blocks 501-506 to implement real-time network communication described herein.

Network interface 510 may provide a generic interface between network transmit/receive blocks 503/506 and drivers 513-515. Through interface 510, various transmit/receive blocks 503/506 in a graphical model may register to send or receive data through a particular network adapter. The transmit/receive blocks 503/506 do not need to be concerned with the particular data format used by each driver 513-515, as the protocol used by each driver 513-515 may be converted into a common interface by network interface 510. In some implementations, network interface 510 may not be needed, and instead, transmit/receive blocks 503/506 may directly communicate with blocks 513-515.

RTOS device 125 may include a number of different network adapters, such as multiple network adapters similar to network adapter 335 (FIG. 3), that are controlled by the model. Each of these network adapters may be associated with a driver, such as drivers 513-515, written for the particular network adapter. The driver for a particular network adapter may be specifically designed to communicate with the hardware associated with the network adapter. Drivers 513-515 may typically be created by, for example, the distributor of TCE 112, the manufacturer of the network adapter, or by another party.

In the exemplary system of FIG. 5, two drivers 513 and 514 are illustrated. Additionally, an "etherlike" driver 515 is illustrated. Driver 515 may correspond to a driver for a network adapter that implements a protocol other than Ethernet. A number of protocols similar-to or based-on Ethernet are known and could be used as the "Etherlike" protocol. For example, one known Ethernet-based protocol is the so-called "EtherCAT" fieldbus system.

Network buffer library 511 and initialization library 512 may represent libraries that may be called by other elements shown in FIG. 5. Network buffer library 511 may handle the internal management of the network buffers used by the network buffer aware blocks, libraries and drivers. For example, network buffer library 511 may handle garbage collection, the creation and management of network buffers and a mapping of physical addresses to network buffers. Initialization library 512 may handle functions relating to the creation and initialization of network connections.

Figure 6:
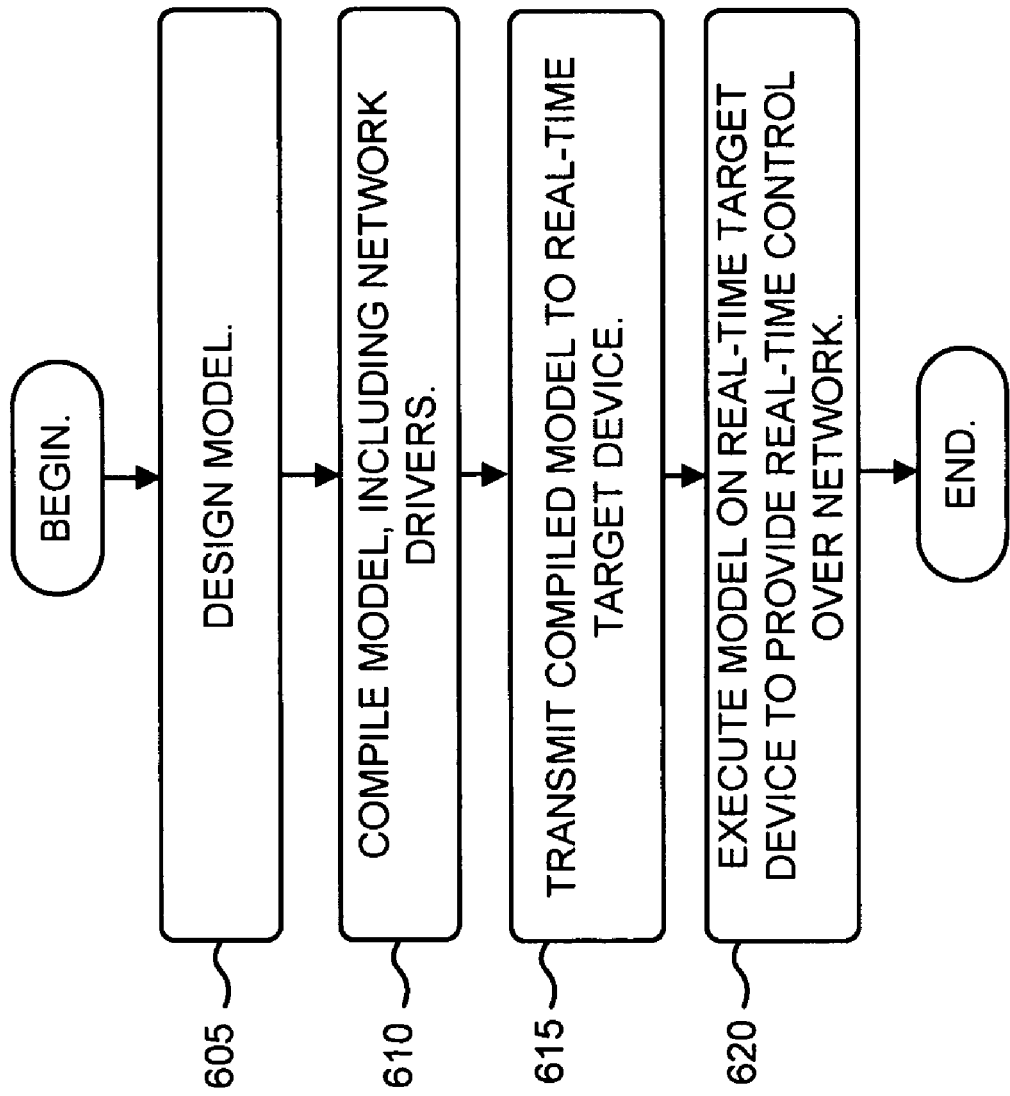
FIG. 6 is a flow chart illustrating exemplary operations relating to real-time network control by a model.

FIG. 6 is a flow chart illustrating exemplary operations relating to real-time network control by a model.

A user may initially design or edit a model, such as the model shown in FIG. 4, using TCE 112 (block 605). The model may include network unaware blocks and network aware blocks.

At some point, the user may have fully tested the model and be ready to deploy the model to its target environment. For instance, the user may wish to deploy the model to one of the RTOS devices 125. The user may then instruct TCE 112 to compile the model for deployment to the selected RTOS device 125 (block 610. In some implementations, the device running TCE 112 may be the same device as the selected RTOS device 125. The model may be compiled to include, in addition to the code corresponding to the model blocks, other network related components necessary for execution of the model. In particular, the network drivers, such as one or more of drivers 513-515, may be compiled as part of the model (block 610). In addition, one or more procedures from network buffer library 511, initialization library 512, or network interface 510, that may be necessary for execution of the model, may also be compiled as part of the model. In this manner, the compiled model may be self-contained with respect to its network communications. In other words, the model may use a separate network channel that does not use OS services or other services that are not part of the model (such as an external background task). Accordingly, the model may control the network channel independently of the OS kernel.

The "compiled" version of the model, as performed in block 610 and as used herein, may generally refer to the generation of executable code, for target RTOS device 125, from the model. The executable code may be, for example, binary code. Alternatively, in situations where the RTOS device 125 is capable of executing non-binary code, such as higher level scripts, the executable code may refer to such non-binary code.

The compiling may include, for example, automatic conversion of a declarative specification to the executable code, possibly in which the declarative specification is converted to one or more intermediate representations. The declarative specification may be, for example, a specification based on a data-flow diagram or a time-based block diagram such as a declarative specification designed using, for example, the software Simulink® by The MathWorks, Inc. The conversion may be custom tailored, for example, by the use of customization files (or other data structures) that describe desired customizations (e.g., platform specific code customizations) for the compiled version of the model. The Target Language Compiler® by The MathWorks, Inc., is one example of a tool for customizing model compilation.

Concepts described herein, however, are not limited to a model expressed using a declarative specification. For example, the model may be directly created using an imperative specification. Also, in some implementations, the compiling may include linking a number of modules that were previously compiled.

The compiled model may be deployed to its target RTOS device 125 (block 615). For example, the model may be sent over shared network link 115 to the target device. Alternatively, the compiled model may be transmitted to the target RTOS device 125 in some other manner, such as by physically carrying the model via a portable drive or compact disk.

The compiled model may be executed on the target RTOS device 125 (block 620). Because the compiled model executes its network control related software internally (i.e., as part of the model), the model has a relatively high level of control over the timing of data transmitted or received over network connections at the target device. Accordingly, variable latency can be reduced relative to systems that do not have as much control over the network software.

Additional Implementation Details

Additional details or alternative implementations relating to the system shown in FIG. 5 can be implemented consistent with techniques described herein. Some of these will now be described with reference to FIGS. 7A-10.

Figure 7A:
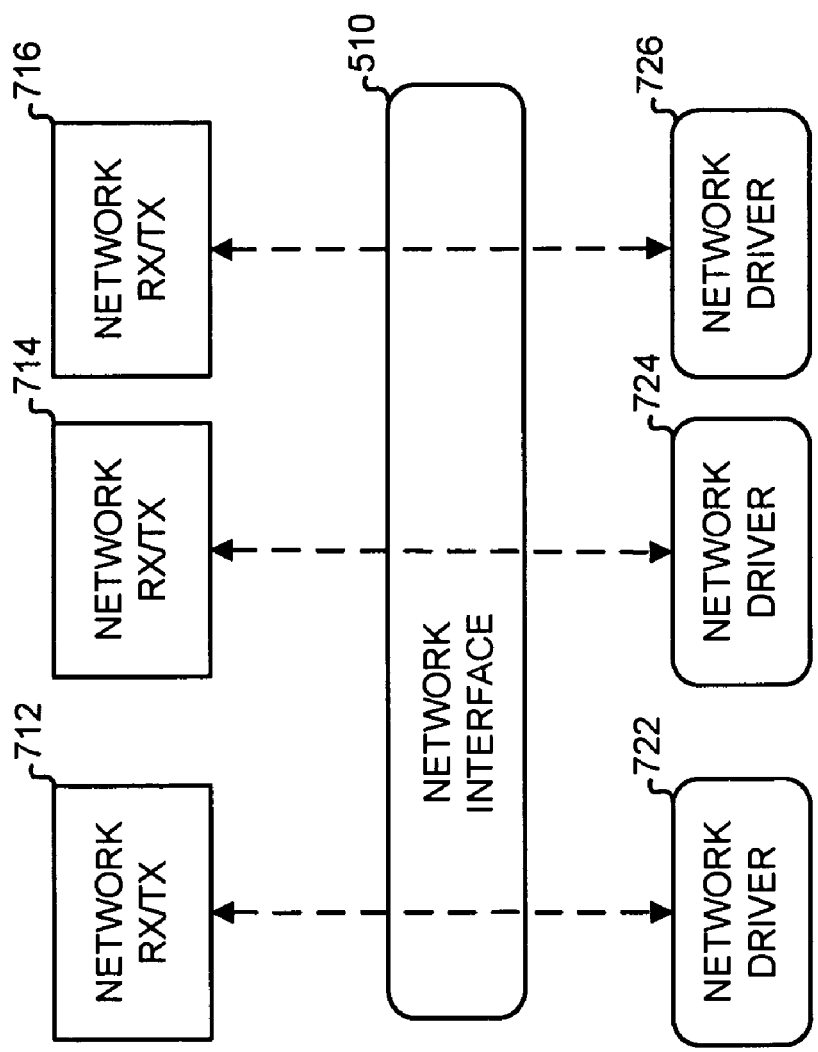
FIGS. 7A and 7B are diagrams illustrating exemplary implementations of a network interface.
Figure 7B:
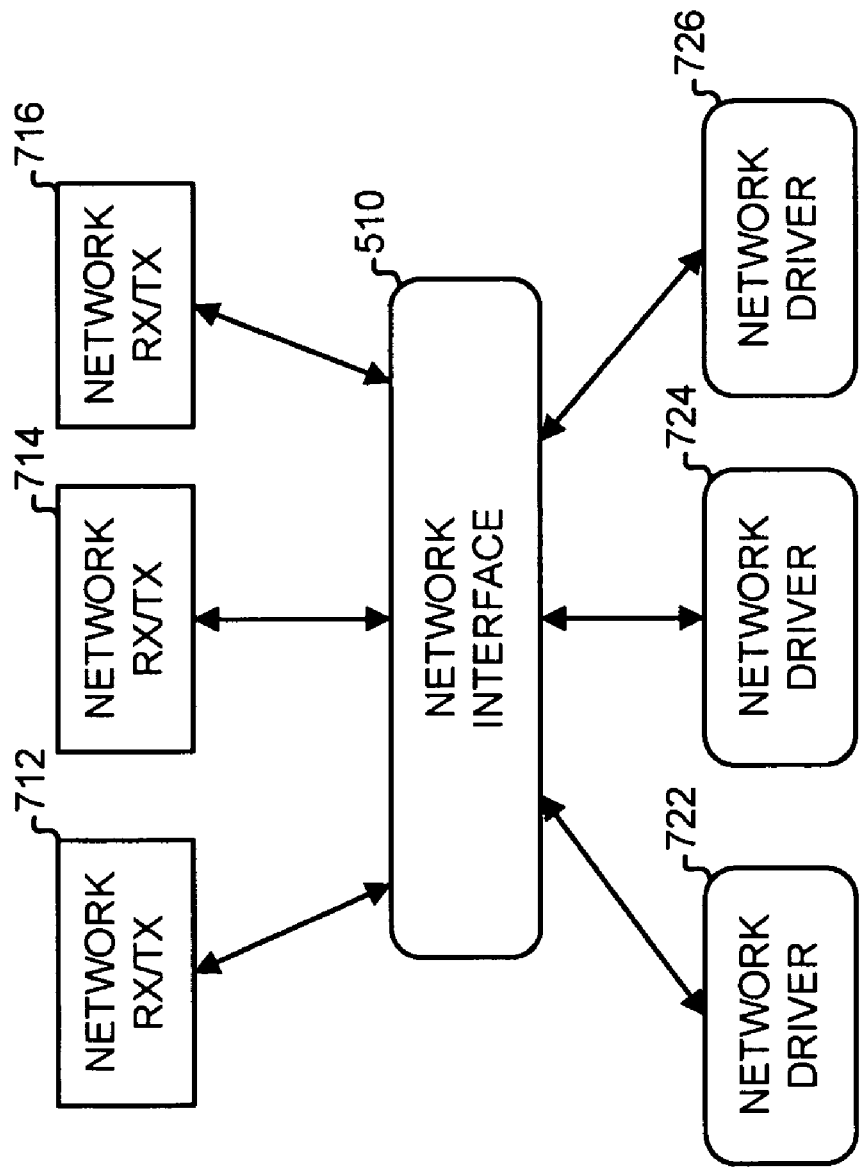

FIGS. 7A and 7B are diagrams illustrating exemplary implementations of network interface 510.

In FIG. 7A, a number of transmit/receive blocks 712, 714, and 716 are illustrated as communicating with corresponding drivers 722, 724, and 726 in a one-to-one relationship through network interface 510. In general, network interface 510 may provide a generic interface for network receive or transmit model blocks 712-716. Network interface 510 may convert calls from network transmit or receive blocks 712, 714, and 716 into calls appropriate for the particular device corresponding to the network adapter that the block is using to receive or transmit data.

Network interface 510 may additionally manage a buffer (circular or otherwise) for each transmit/receive block 712-716 which is used by network interface 510 as a buffer for communicating between transmit/receive blocks 712-716 and the corresponding drivers 722-726. As shown in FIG. 7A, network receive/transmit block 712 communicates with network driver 722, network receive/transmit block 714 communicates with network driver 724, network receive/transmit block 716 communicates with network driver 726. In this implementation, network interface 510 functions as a "pass-through" interface that translates and forwards communications between transmit/receive blocks 712-716 and the corresponding drivers 722-726.

FIG. 7B is a diagram illustrating a number of transmit/receive blocks 712-716 and corresponding network drivers 722-726 according to a second implementation. FIG. 7B is similar to FIG. 7A, except that interface 510, instead of implementing a one-to-one relationship between transmit/receive blocks 712-716 and drivers 722-726, implements a many-to-many relationship between transmit/receive blocks 712-716 and drivers 722-726. In this implementation, an identifier may be used in communications by transmit/receive blocks 712-716 to identify the appropriate driver for the communications. Network interface 510 may use the identifier to determine which driver is intended as the destination of the communications and may manage a separate buffer (circular or otherwise) for each model block/driver pairing.

The concept of a network buffer aware model block was previously discussed. This concept is illustrated in more detail in FIGS. 8A and 8B.

FIG. 8A is a diagram illustrating network buffer aware blocks in the network transmit path of a model. Model portion 810 includes a number of blocks 812, 814, 816, 818, and 820, associated with a graphical model, such as the graphical model presented in FIG. 4. These blocks may include a data source block 812, a compose block 814, a network buffer aware block 816, a network buffer aware block 818, and a network transmit (TX) block 820.

Data source block 812 may include any block that generates data in the graphical model. As previously mentioned, the graphical model may include a number of blocks that perform one or more functions before transmitting data to the network aware portion of the model. Data source block 812 may represent the last block in the model before the network aware blocks, such as block 420 in FIG. 4.

Blocks 814, 816, 818, and 820 represent the network aware blocks in the graphical model. Compose block 814, network buffer aware blocks 816 and 818, and network transmit block 820 may function in a manner similar to the functions of blocks 501, 502, and 503 (FIG. 5). Data manipulated by these blocks may be passed via pointers that reference the network buffers maintained by network buffer library 511. Network buffer aware blocks 816 and 818, for instance, may represent custom blocks, such as blocks designed by the user of TCE 112 to manipulate data in network buffers. Network buffer aware blocks 816 and 818 may communicate with network buffer library 511 and initialization library 512 to manipulate the data in the network buffers. Network buffer aware blocks 816 and 818 may, for instance, filter or in some way modify the data in the network buffer. Although two "generic" network buffer aware blocks 816 and 818 are shown in FIG. 8A, a model may include some number of such network buffer aware blocks, including none.

FIG. 8B is a diagram illustrating network buffer aware blocks in the network receive path of a model. Model portion 830 includes a number of blocks 832, 834, 836, 838, and 840, associated with a graphical model. These blocks may include a network receive (RX) block 832, a network buffer aware block 834, a network buffer aware block 836, an extract block 838, and a data sink block 840.

Blocks 832, 834, 836, and 838 represent network aware blocks in the graphical model. Network receive block 832, network buffer aware blocks 834 and 836, and extract block 838 may function in a manner similar to the functions of blocks 506, 505, and 504 (FIG. 5). Data manipulated by these blocks may be passed via a pointer that references the network buffers maintained by network buffer library 511. Network buffer aware blocks 834 and 836, for instance, may represent custom blocks, such as blocks designed by the user of TCE 112 to manipulate data in network buffers. Network buffer aware blocks 834 and 836 may communicate with network buffer library 511 and initialization library 512 to manipulate the data in the network buffers. Network buffer aware blocks 834 and 836 may, for instance, filter or in some way modify the data in the network buffer. Although two "generic" network buffer aware blocks 834 and 836 are shown in FIG. 8, a model may include other numbers of such network buffer aware blocks, including none.

Data sink block 840 may include a block in the graphical model that receives the data from the network aware blocks. Data sink block 840 may receive the data from extract block 838 in a non-network aware format, such as a vector in which the data is not passed by reference. Data sink block 840 may generally represent the first block in the model after the network aware blocks.

Figure 9:
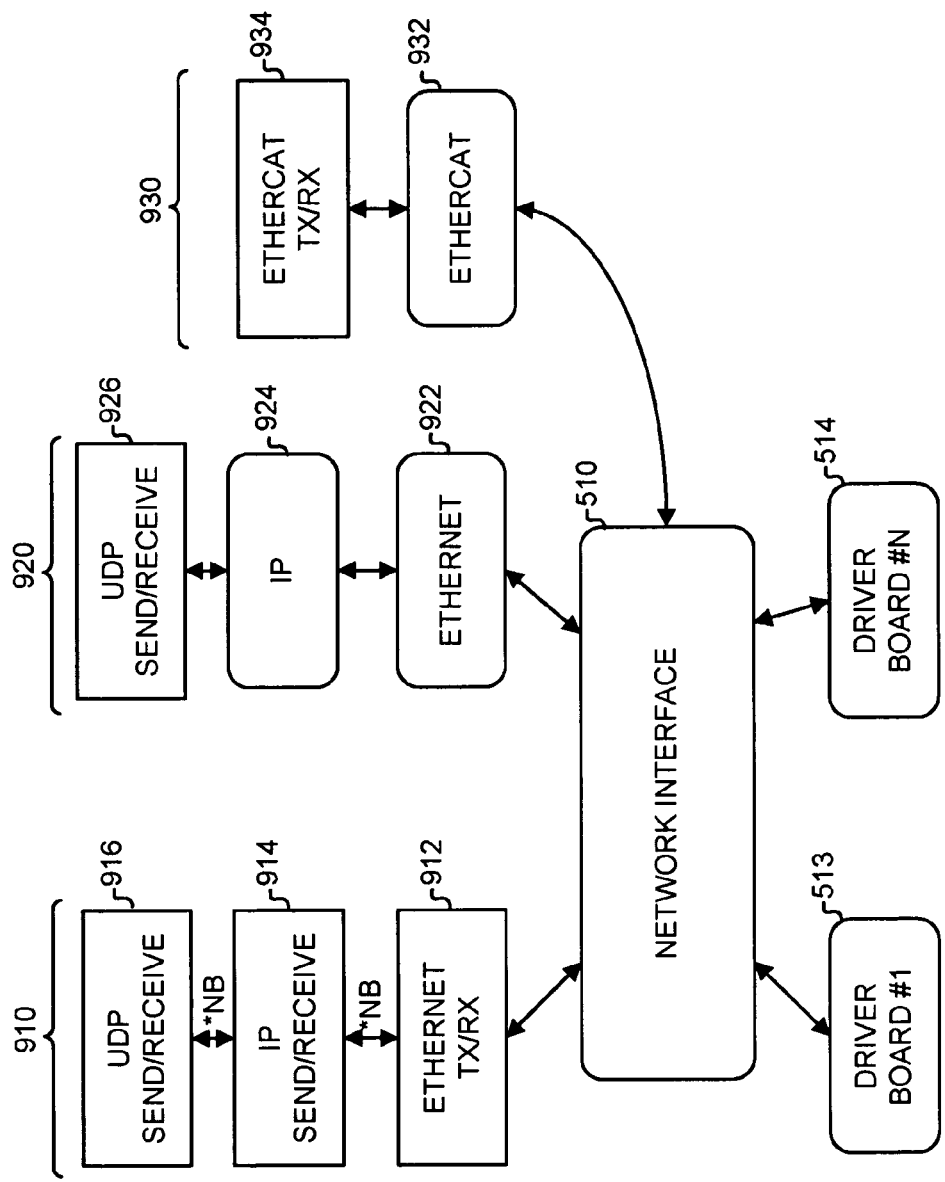
FIG. 9 is a diagram illustrating exemplary software sections of a model.

FIG. 9 is a diagram illustrating exemplary software sections of a model. The arrangement of the software components illustrated in FIG. 9 is similar to those shown in FIG. 5. In FIG. 9, components are configured to implement various protocols including Ethernet, IP and UDP. As in FIG. 5, components in FIG. 9 that may normally be manipulated by the user (e.g., blocks in model area 470) when designing a model are shown as rectangles. Other software components used by TCE 112 and integrated into the compiled version of the model, such as libraries, drivers, or other software modules, are shown as rectangles with rounded edges.

Three different example arrangements that implement real-time network control over Ethernet are shown in FIG. 9, labeled as block sequences 910, 920, and 930.

Block sequence 910 includes Ethernet transmit/receive block 912, User Datagram Protocol (UDP) block 916, and Internet Protocol (IP) block 914. Blocks 912-916 may all be blocks that are manipulable as part of the graphical model. Block 912 may communicate with network interface 510 to provide for the sending and receiving of data via Ethernet in a manner similar to that described for blocks 503 and 506 (FIG. 5). Blocks 914 and 916 provide for successively higher levels of networking protocols that may be implemented on top of Ethernet. More specifically, block 914 may implement IP. Block 916 may interact with block 914 to implement the UDP protocol on top of IP. UDP is a known protocol for sending short messages called datagrams.

Blocks 912, 914, and 916 may communicate with each other by passing a pointer to an appropriate network buffer. That is, blocks 912, 914, and 916 may be network aware blocks that are manipulable in the graphical model. With blocks 912, 914, and 916, a user of TCE 112 may integrate different networking protocols by selecting and arranging blocks 912, 914, and 916 (or other blocks) as desired.

Block sequence 920 includes Ethernet library 922, IP library 924, and UDP send/receive block 926. Block sequence 920 is similar to block sequence 910 in that both may provide access to the IP protocol from within a graphical model. In block sequence 920, however, the core implementations of the Ethernet and IP protocols may be performed by a library or other software module that may be distributed as part of TCE 112. Thus, in this implementation of the UDP protocol in a graphical model, a user can add UDP capabilities to the model by adding a single graphical block to the model. TCE 112 may then call Ethernet library 922 and IP library 926 as appropriate.

Block sequence 930 includes EtherCAT library 932 and EtherCAT transmit/receive block 934. EtherCAT is a known networking protocol that is based on Ethernet. EtherCAT library 932 and EtherCAT transmit/receive block 934 may provide a network interface based on EtherCAT. The user may design the model to include the capabilities offered by EtherCAT and TCE 112 may then use EtherCAT library 932 as needed.

Figure 10:
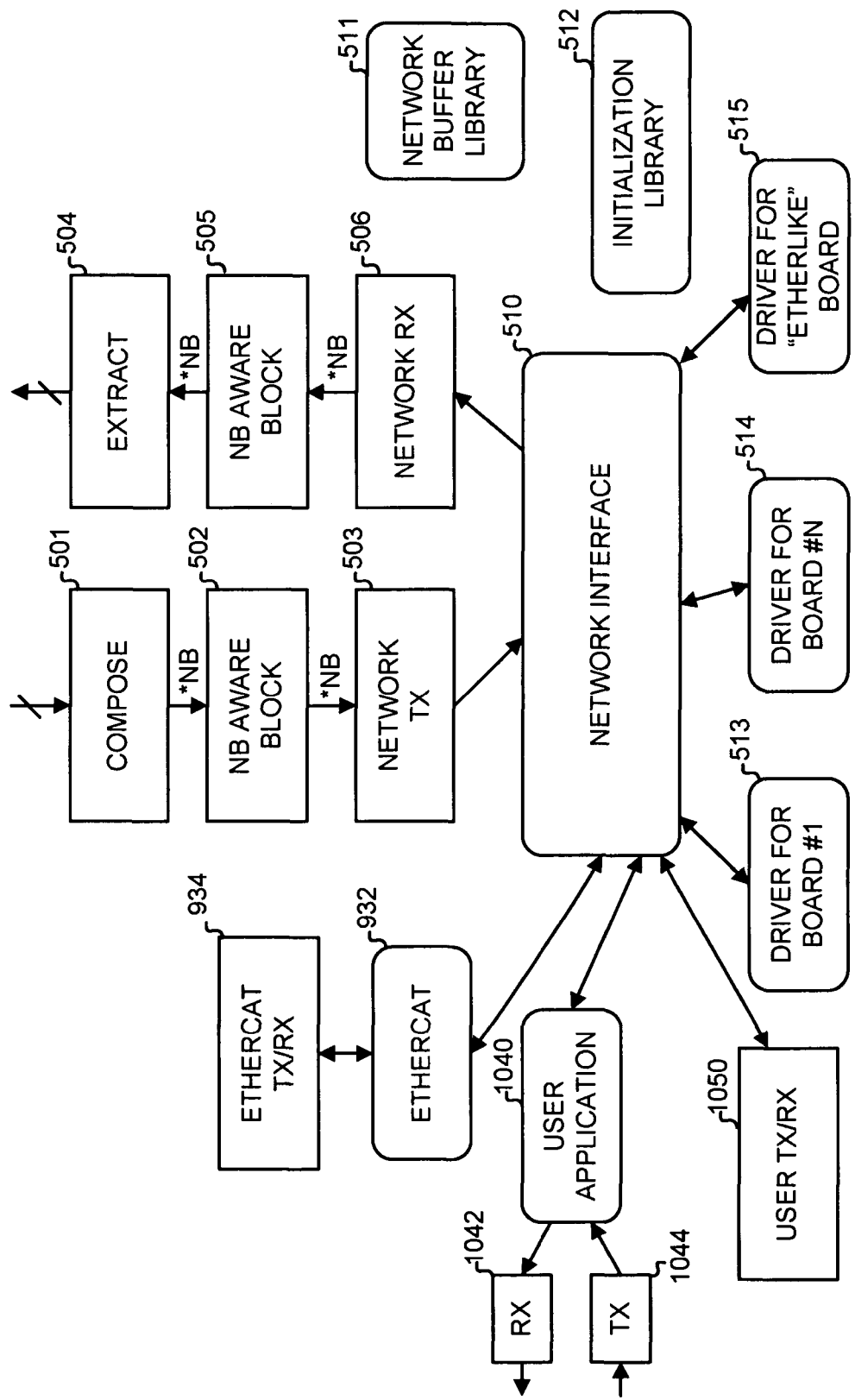
FIG. 10 is a diagram illustrating additional exemplary software sections of a model.

FIG. 10 is a diagram illustrating exemplary software sections of a model. FIG. 10 illustrates a number of features similar to that shown in FIG. 5 or 9 but illustrates additional combinations of custom or standard model blocks and/or libraries. As with the discussion of FIGS. 5 and 9, components that may normally be manipulated by the user (e.g., blocks in model area 470) when designing a model are shown as rectangles while other components (e.g., libraries, drivers, or other software modules) are shown as rectangles with rounded edges.

A number of model blocks and libraries are shown in FIG. 10, including compose block 501, network buffer aware block 502, network transmit block 503, extract block 504, network buffer aware block 505, network receive block 506, network interface 510, network buffer library 511, initialization library 512, drivers 513 through 515, EtherCAT library 932, and EtherCAT transmit/receive block 934. These components were described with reference to FIG. 5 or 9 and will thus not be again described.

In addition to custom networking libraries, such as EtherCAT library 932, designed to interact with network interface 510, users may be given the option to write more general custom applications. A custom application is illustrated in FIG. 10 as user application 1040. In this example, user application 1040 is connected to receive model block 1042 and transmit model block 1044. Custom application 1040 can be an application that interacts with the program interface provided by network interface 510 and may perform functions that may be programmed by the user. Receive model block (RX) 1042 and transmit model block (TX) 1044 may also be custom blocks designed to interact with user application 1040.

User transmit/receive block 1050 may be a custom block created by a user of TCE 112. In this example, user transmit/receive block 1050 communicates directly with network interface 510.

It can be appreciated that the various network communication sequences shown in FIG. 10 represent possible ways in which real-time control over a network that implements, e.g., Ethernet, EtherCAT, etc. may be accomplished consistent with aspects described herein. A typical model may include less than all of the various sequences shown in FIG. 10.

Additionally, although concepts described herein are described as being applicable to Ethernet or Ethernet-like communications, networking protocols other than Ethernet may be alternatively implemented.

Network Buffers

As previously mentioned, blocks in a model may include "network aware" blocks that are explicitly defined to interact with buffers of network data. Additional details relating to network buffers, as implemented in one possible implementation, will now be described.

Network buffer library 511 may keep track of and maintain a pool of network buffers that may be used by different elements in the model. Network buffers may be chained together in a linked list. In this implementation, only a single pointer to the first buffer in a linked list needs to be passed between blocks.

By passing buffer pointers between the network aware sections of a model, large amounts of data can be passed through the model with as few copies as possible. Accordingly, with buffers, copying of the data may be delayed until finally necessary.

Network aware buffers and libraries may use network buffers, thus potentially providing seamless transition between buffers and libraries. Network aware blocks and libraries may both be designed, for example, to "accept" incoming network buffers in a particular manner, such as via a call to network buffer library 511. These blocks and libraries may similarly "release" the network buffer when it transmits it to a next element in the model. If the next block or library does not accept a released buffer, network library 511 may mark the buffer for garbage collection and may subsequently reclaim the memory corresponding to the network buffer.

Timing of a Model 310 on RTOS Device 125

Figure 11C:
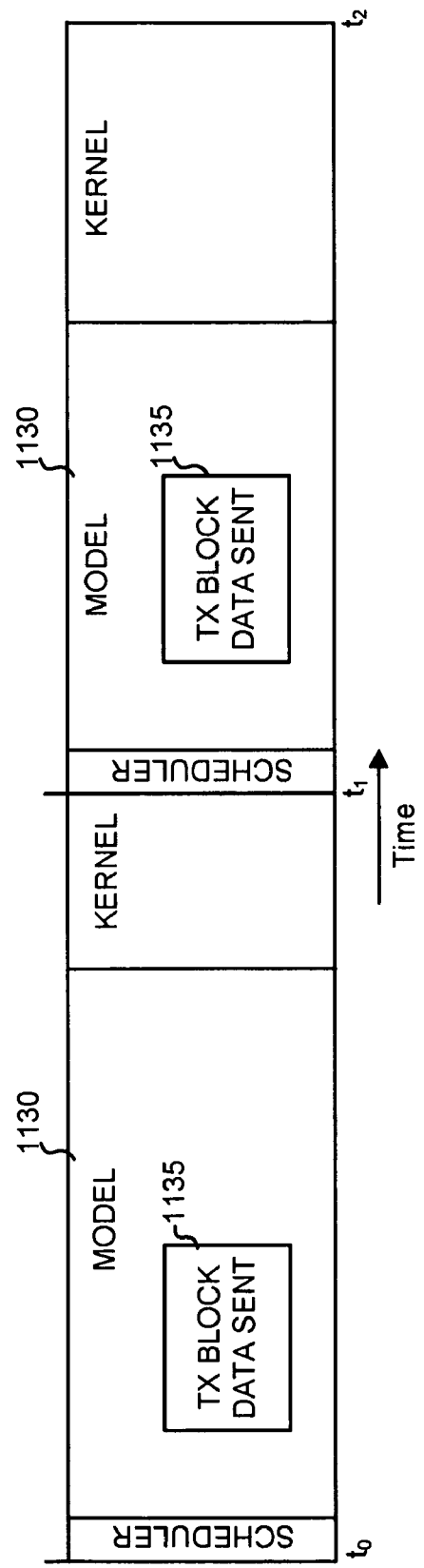

In order to more fully describe the operation of model 310 in a RTOS device, it will be helpful to describe the timing of a model executing in the RTOS device. FIGS. 11A-11C are exemplary timing diagrams illustrating execution of a model in relation to an OS kernel. Note that the kernel may be real-time.

FIGS. 11A and 11B illustrate timing diagrams for execution of a model 1110 that communicates over a network using networking services provided by the real-time OS kernel 1125. In the context of FIG. 3, this situation may correspond to the model communicating with devices over a shared network connection using network adapter 330.

As shown in FIG. 11A, model 1110 may include a scheduler portion 1115 that schedules the execution sequence of the blocks of the model. Each iteration of the model may begin based on a sampling interrupt period. For example, the designer of the model may specify that the model execute 100 times a second. Accordingly, the OS may initiate an iteration of the model every $1/100^{th}$ of a second, illustrated in FIGS. 11A and 11B as interrupts $t_0$, $t_1$, $t_2$. Interrupts $t_0$, $t_1$, and $t_2$ may be generated by, for example, a hardware timer or another source.

In FIG. 11A, model 1110 includes a transmit block 1120 that may transmit data over the network connection. Because model 1110 is implemented to use the network services of the kernel, the actual data may be transmitted by the kernel, which resumes execution after model 1110 completes its execution for the iteration.

The execution time of model 1110 may vary depending on factors such as the data operated on by the model. In the first sampling period shown in FIG. 11B, assume that the execution of model 1110 takes most of the execution period to complete. Here, kernel 1125 executes for a shorter period of time before beginning the next model interval. In this situation, kernel 1125 may not have enough time to completely finish the sending of data, which may thus be delayed until after the next interval.

FIGS. 11A and 11B illustrate one situation that may cause non-deterministic sending of data by a model when using a conventionally implemented network channel through the OS kernel.

FIG. 11C illustrates a timing diagram for execution of a model 1130 that communicates over a network using networking services provided by the model, as was described herein. As shown, data sent by a transmit block 1135 is sent as part of execution of the block. Accordingly, even when the model consumes a large portion of its allotted execution interval, the data is still sent within the interval. Accordingly, the data can still be sent in a relatively deterministic manner.

CONCLUSION

Techniques were described herein for transmitting network data from a model using networking services integrated within the model.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 6, the order of the acts may be modified in other implementations. Further, non-dependent acts may be performed in parallel.

Also, the term "user" has been used herein. The term "user" is intended to be broadly interpreted to include, for example, a computer system (e.g., a workstation) or a user of a computer system.

It should be noted that in the figures and above description, blocks that are shown as transmit/receive, send/receive, transmit, send or receive may be implemented with one or more blocks. It can be appreciated that a combined transmit/receive block is functionally equivalent to separate transmit and receive blocks.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software. The logic may be encoded in one or more executable media and may include instructions for execution on a processing unit, such as processing unit 220.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. One or more non-transitory computer-readable media storing executable instructions for execution by processing logic, the executable instructions comprising:
    one or more instructions, which, when executed by the processing logic, cause the processing logic to obtain a compiled model, that represents a design, for execution on a target computing device, the compiled model including one or more components for directly communicating with a network adapter on the target computing device to handle network communications; and
    one or more instructions, which, when executed by the processing logic, cause the processing logic to transmit the compiled model to the target computing device, the model, when executed, providing control over network communications at the target computing device, where the control provided over network communications by the model occurs separately from network communications provided by an operating system executing on the target computing device.

2. The non-transitory computer-readable media of claim 1, where the one or more instructions to cause the processing logic to obtain the model includes one or more instructions to cause the processing logic to compile the model to obtain a compiled representation of the model.

3. The non-transitory computer-readable media of claim 1, where the model is a graphical model.

4. The non-transitory computer-readable media of claim 3, where the model is expressed using a declarative specification.

5. The non-transitory computer-readable media of claim 4, where the graphical model includes a time-based block diagram or a data flow diagram.

6. The non-transitory computer-readable media of claim 1, where the model is expressed using an imperative specification.

7. The non-transitory computer-readable media of claim 1, where the model is expressed using an array-based specification.

8. The non-transitory computer-readable media of claim 1, where the control over network communications at the target computing device is in real time.

9. The non-transitory computer-readable media of claim 1, where the one or more components for directly communicating with the network adapter include one or more components for Ethernet communications.

10. The non-transitory computer-readable media of claim 9, where the one or more components for directly communicating with the network adapter include software drivers.

11. The non-transitory computer-readable media of claim 1, where the model is expressed using a plurality of graphical blocks, a block defining a functionality of the model.

12. The non-transitory computer-readable media of claim 11, where the plurality of blocks of the graphical model include one or more network aware blocks that communicate data related to the network communications.

13. The non-transitory computer-readable media of claim 12, where the network aware blocks communicate data related to the network communications based on one or more pointers to one or more buffers in which the data is stored.

14. The non-transitory computer-readable media of claim 11, where the plurality of blocks of the graphical model include one or more network unaware blocks that communicate data related to the network communications.

15. The non-transitory computer-readable media of claim 14, where the network unaware blocks communicate data related to the network communications as vectors or other structures.

16. The non-transitory computer-readable media of claim 11, where the plurality of graphical blocks of the model include one or more network communications blocks that, when included in the model, provide one or more network communication services for the model.

17. The non-transitory computer-readable media of claim 16, where the network communications blocks include one or more Ethernet communications blocks that, when included in the model, provide one or more Ethernet communication services for the model.

18. One or more non-transitory computer-readable media storing executable instructions for execution by processing logic, the executable instructions comprising:
one or more instructions, which, when executed by the processing logic, cause the processing logic to receive a compiled application at a target computing device that is executing an operating system, the application representing a design, the application having been compiled to include one or more software components for directly communicating with a network adapter on the target computing device to handle network communications, where the communication through the network adapter occurs without using network services provided by the operating system; and
one or more instructions, which, when executed by the processing logic, cause the processing logic to execute the compiled application at the target computing device, the application, when executed, providing control over network communications handled through the network adapter.

19. The non-transitory computer-readable media of claim 18, where the control over network communications handled through the network adapter is handled in real time.

20. The non-transitory computer-readable media of claim 18, where the one or more software components include a driver for Ethernet communications, the non-transitory computer-readable media further comprising:
one or more instructions, which, when executed by the processing logic, cause the processing logic to perform Ethernet communications.

21. The non-transitory computer-readable media of claim 18, where the instructions for receiving the compiled application at the target device include one or more instructions for receiving the compiled application through a second network adapter that is accessed through communication services provided by an operating system of the target computing device.

22. A computing device comprising:
a network adapter;
processing logic; and
a memory, the memory including instructions executable by the processing logic to:
implement an operating system, and
implement a model that runs under control of the operating system, the model including one or more software components for directly communicating with the network adapter, where the one or more software components communicate with the network adapter without using networking services provided by the operating system.

23. The computing device of claim 22, further comprising:
a second network adapter, where the model communicates with the second network adapter using software components supported by the operating system.

24. The computing device of claim 23, where the one or more software components include one or more drivers for Ethernet communications, and where the memory further includes instructions to:
perform Ethernet communications.

25. The computing device of claim 22, where portions of the model related to communicating with the network adapter pass references to network data.

26. The computing device of claim 25, where the network data are passed as one or more pointers to one or more buffers.

27. A system comprising:
a computing device including:
a network adapter,
processing logic,
an operating system, and
a compiled version of a model, executed by the processing logic under control of the operating system, the model interacting with one or more network devices over a communications network using one or more software components that are compiled as part of the model and that directly communicate with the network adapter, where the one or more software components communicate with the one or more network devices without using networking services provided by the operating system.

28. The system of claim 27, where the one or more network devices include at least one of sensors or actuators.

29. The system of claim 27, where the one or more software components include Ethernet drivers and where the one or more software components communicate with the one or more network devices using an Ethernet protocol.

30. A method comprising:
obtaining a compiled model, that represents a design, for execution on a target computing device, the compiled model including one or more components for directly communicating with a network adapter on the target computing device to handle network communications, where the obtaining is performed by a network device; and
transmitting the compiled model to the target computing device, the model, when executed, providing control over network communications at the target computing device, where the control provided over network communications by the model occurs separately from network communications provided by an operating system executing on the target computing device, and where the transmitting is performed by the network device.

31. The method of claim 30, where the control over network communications at the target computing device is in real time.

32. A method comprising:

receiving a compiled application at a target computing device that is executing an operating system, the application representing a design, the application having been compiled to include one or more software components for directly communicating with a network adapter on the target computing device to handle network communications; and executing the compiled application at the target computing device, the application, when executed, providing control over network communications handled through the network adapter, where the control provided over network communications by the application occurs separately from network communications provided by the operating system.

* * * * *